US012640512B2

(12) United States Patent
Chen

(10) Patent No.: US 12,640,512 B2

(45) Date of Patent: *May 26, 2026

(54) INSULATING HOUSING HAVING DISTINCT POWER TERMINAL AND SIGNAL TERMINAL PORTIONS

(71) Applicant: BELLWETHER ELECTRONIC CORP., Taoyuan City (TW)

(72) Inventor: Sung-Yu Chen, Taichung City (TW)

(73) Assignee: BELLWETHER ELECTRONIC CORP., Taoyuan City (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/675,109

(22) Filed: May 27, 2024

(65) Prior Publication Data

US 2024/0313463 A1 Sep. 19, 2024

Related U.S. Application Data

(63) Continuation of application No. 17/870,845, filed on Jul. 22, 2022, now Pat. No. 12,046,852, which is a (Continued)

(30) Foreign Application Priority Data

May 25, 2022 (TW) ................................ 111205419

(51) Int. Cl.
*H01R 13/504* (2006.01)
*H01R 13/422* (2006.01)

(52) U.S. Cl.
CPC ..... *H01R 13/5045* (2013.01); *H01R 13/4223* (2013.01)

(58) Field of Classification Search
CPC ............ H01R 13/5045; H01R 13/4223; H01R 13/6272
See application file for complete search history.

(56) References Cited

U.S. PATENT DOCUMENTS 6,824,426 B1 * 11/2004 Spink, Jr. ........... H01R 13/5845 439/579
8,257,115 B2 * 9/2012 Herring ............. H01R 13/6272 439/620.21

(Continued)

FOREIGN PATENT DOCUMENTS

CN 203491417 U 3/2014
TW M351479 U 2/2009

(Continued)

*Primary Examiner* — Renee S Luebke

(74) *Attorney, Agent, or Firm* — Li & Cai Intellectual Property Office

(57) ABSTRACT

A cable connector and an insulating housing configured for the cable connector are provided. The insulating housing includes a body portion, a power mating portion, and a snap-fit member. The body portion has a first surface and a second surface disposed opposite to each other in a first direction, and a third surface and a fourth surface disposed opposite to each other. The first surface and the second surface are connected between the third surface and the fourth surface, and a plurality of first channels are formed therein along the first direction. The power mating portion is disposed on the second surface and has a plurality of column bodies. Each of the column bodies has a first end connected to the second surface and a second end. The plurality of first channels respectively penetrate the plurality of column bodies.

7 Claims, 10 Drawing Sheets

Related U.S. Application Data continuation-in-part of application No. 17/306,961, filed on May 4, 2021, now Pat. No. 11,437,746.

(60) Provisional application No. 63/020,551, filed on May 6, 2020.

(56) References Cited

U.S. PATENT DOCUMENTS

| | | | | |
|---|---|---|---|---|
| 9,147,957 | B2 * | 9/2015 | Randolph | H01R 24/20 |
| 9,614,329 | B2 * | 4/2017 | Chen | H01R 13/642 |
| 11,990,703 | B2 * | 5/2024 | Chen | H01R 13/5045 |
| 12,046,852 | B2 * | 7/2024 | Chen | H01R 13/5045 |

FOREIGN PATENT DOCUMENTS

| | | | |
|---|---|---|---|
| TW | M564273 | U | 7/2018 |
| TW | M566422 | U | 9/2018 |

* cited by examiner

INSULATING HOUSING HAVING DISTINCT POWER TERMINAL AND SIGNAL TERMINAL PORTIONS

CROSS-REFERENCE TO RELATED PATENT APPLICATION

This application is a Continuation Application of the U.S. application Ser. No. 17/870,845, filed on Jul. 22, 2022 and entitled "INSULATING HOUSING AND WIRE-END CONNECTOR".

This application claims the benefit of priority to Taiwan Patent Application No. 111205419, filed on May 25, 2022. The entire content of the above identified application is incorporated herein by reference.

This application claims the benefit of priority to the U.S. Provisional Patent Application Ser. No. 63/020,551 filed on May 6, 2020, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an insulating housing and an electrical connector, and more particularly to an insulating housing and an electrical connector that have a power portion and a signal portion.

BACKGROUND OF THE DISCLOSURE

Electronic products have developed toward miniaturization, resulting in limited space in the electronic products.

For electronic components that are required to be connected to power wires and signal wires (e.g., control signal wires, or detection signal wires, etc.), wire-to-board connectors are conventionally designed to have separate connections, in which a power connector and a signal connector are respectively used for connection and transmission. The power connector is connected to a power wire, and the signal connector is connected to a plurality of signal wires.

A conventional connection process for transmitting power and signal separately is complicated and takes up space, which does not match the recent trend of miniaturization and is time-consuming.

Therefore, how to improve the structural design to allow the wire-to-board connectors to conform to the trend of miniaturization, so as to overcome the above-mentioned deficiencies, has become an issue to be addressed in this technological field.

SUMMARY OF THE DISCLOSURE

In response to the above-referenced technical inadequacy, the present disclosure provides an insulating housing and an electrical. Also included herein is a connection manner for transmission of power and signal.

In one aspect, the present disclosure provides an insulating housing configured for a cable connector, including: a body portion, a power mating portion and a snap-fit member. The body portion has a first surface and a second surface disposed opposite to each other in a Y-axis direction, and a third surface and a fourth surface disposed opposite to each other. The first surface and the second surface are connected between the third surface and the fourth surface, and a plurality of first channels are formed therein along the Y-axis direction. The power mating portion is disposed on the second surface and has a plurality of column bodies. Each of the column bodies has a first end connected to the second surface and a second end. The plurality of first channels respectively penetrate the plurality of column bodies. The snap-fit member is disposed on the fourth surface, and the snap-fit member has a press portion and a snap-fit portion that are connected with each other along the Y-axis direction. The press portion has a pressing surface that is configured to be pressed by a user, the pressing surface is parallel to an X-Y plane defined by the Y-axis direction and an X-axis direction that is perpendicular to the Y-axis direction, and a width of the pressing surface along the X-axis direction is at least 1.5 times a width of the snap-fit portion along the X-axis direction.

In another aspect, the present disclosure provides a cable connector, including a body portion, a power mating portion, a plurality of power terminals and a snap-fit member. The body portion has a plurality of first channels therein. The power mating portion is disposed on one side of the body portion and has a plurality of column bodies, wherein the plurality of first channels respectively penetrate the plurality of column bodies. The plurality of power terminals is respectively disposed in the plurality of column bodies. The snap-fit member is disposed on a first surface of the body portion and has a press portion and a snap-fit portion, wherein the press portion has a fan-shaped portion.

Therefore, one of the advantageous effects of the present disclosure is that, the insulating housing and the electrical connector provided by the present disclosure utilizes the connection manners for combined transmission of power and signal, thereby allowing the mating process to be simplified and saving space to match the current trend of miniaturization.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
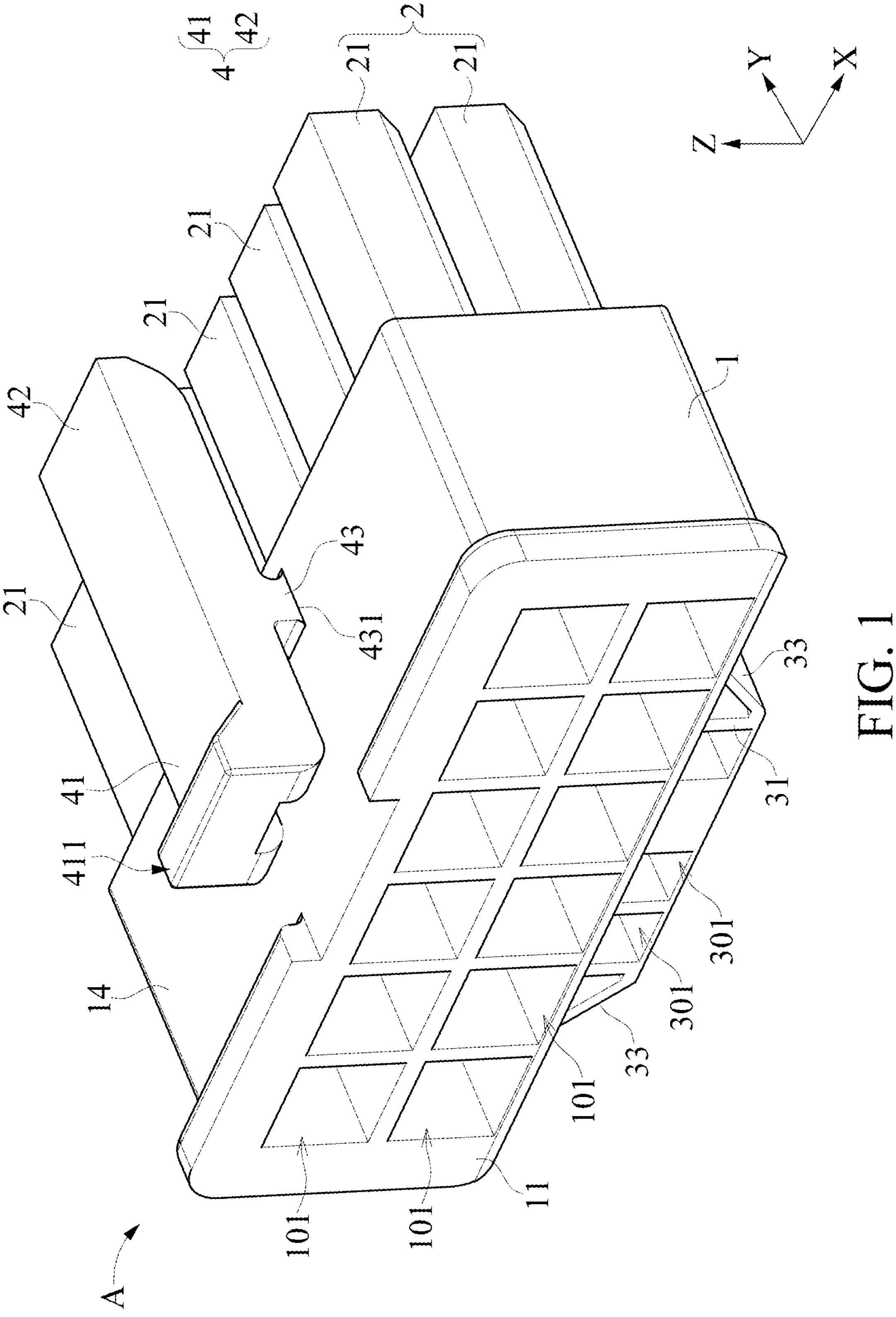
FIG. 1 is a perspective view of an insulating housing according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
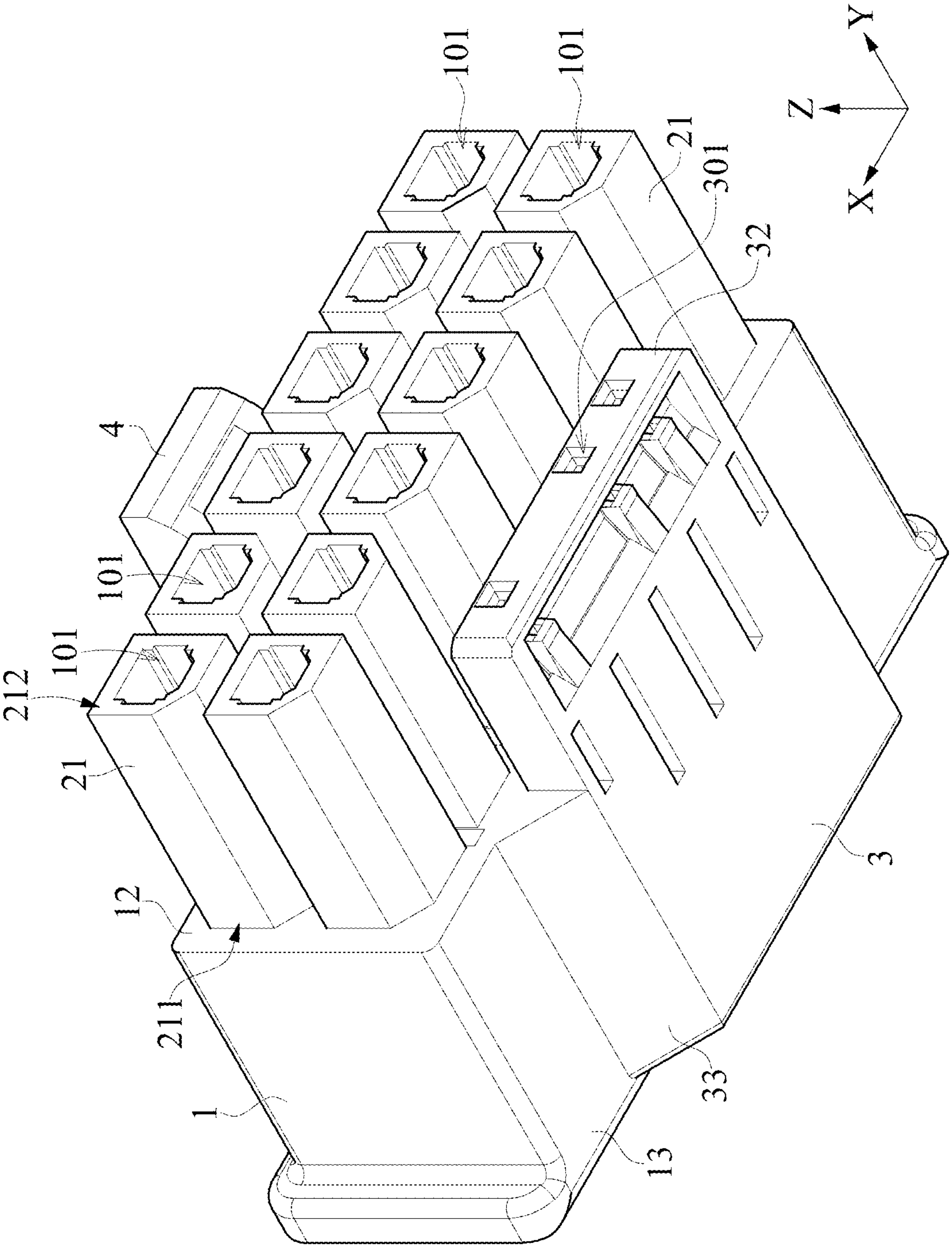
FIG. 2 is another perspective view of the insulating housing according to the first embodiment of the present disclosure.
Figure 3:
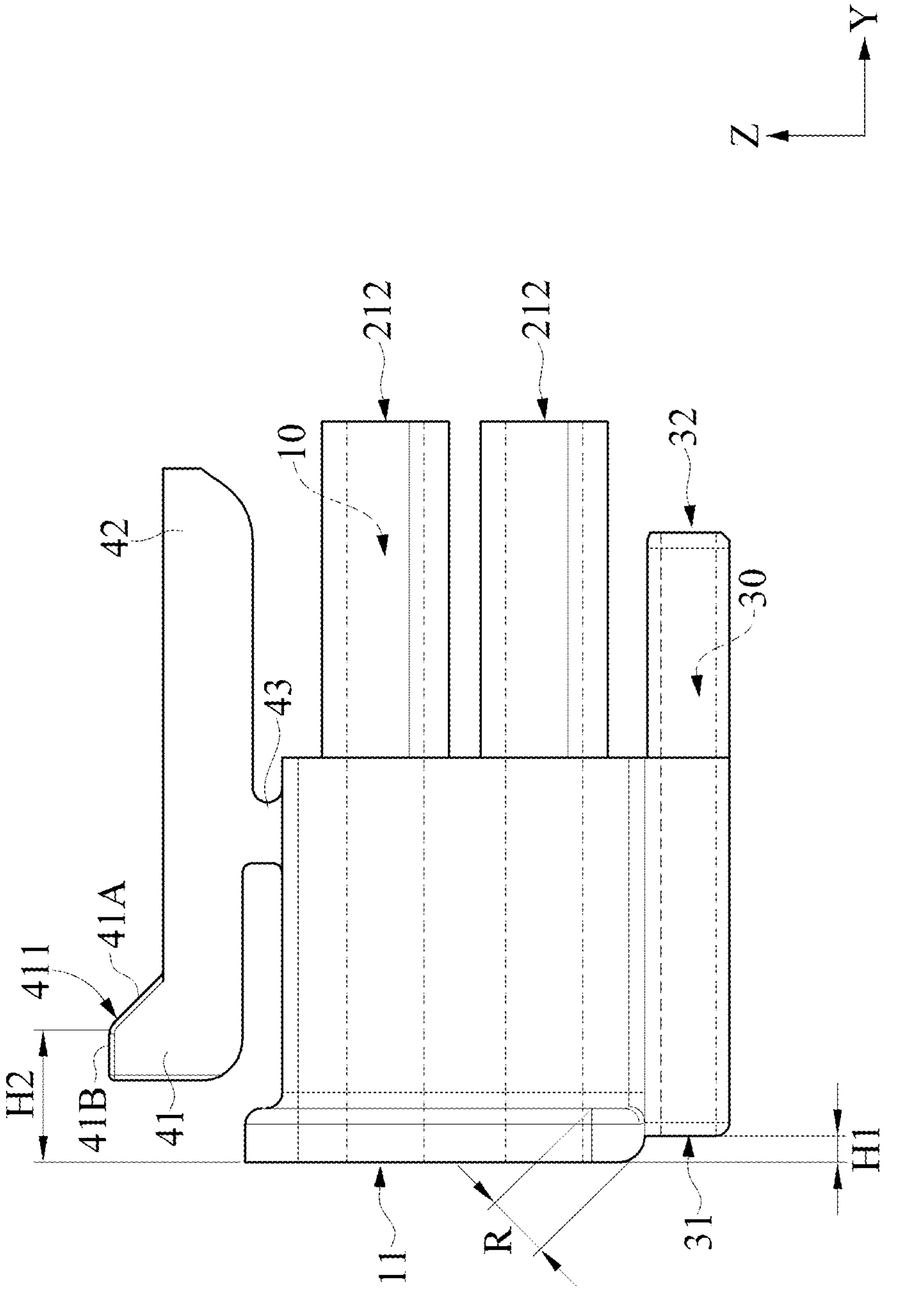
FIG. 3 is side view of the insulating housing according to the first embodiment of the present disclosure.

Reference is made to FIGS. 1 to 3. FIG. 1 is a perspective view of an insulating housing according to a first embodiment of the present disclosure, FIG. 2 is another perspective view of the insulating housing according to the first embodiment of the present disclosure, and FIG. 3 is a side view of the insulating housing according to the first embodiment of the present disclosure. The first embodiment of the present disclosure provides an insulating housing A for wire-end connectors, and the insulating housing A includes a body portion 1, a power mating portion 2, a signal mating portion 3, and a snap-fit member 4.

The body portion 1 has a first surface 11, a second surface 12, a third surface 13, and a fourth surface 14. The first surface 11 is disposed opposite to the second surface 12, the third surface 13 is disposed opposite to the fourth surface 14, and the first surface 11 and the second surface 12 are connected between the third surface 13 and the fourth surface 14. A plurality of first channels 10 are formed inside the body portion 1 in a first direction (Y-axis direction). The plurality of first channels 10 are arranged in at least one row, and the plurality of first channels 10 are exemplified as being arranged in two horizontal and parallel rows in this embodiment.

The power mating portion 2 is disposed on the second surface 12 on one side of the body portion 1. The power mating portion 2 includes a plurality of column bodies 21 that are in horizontal and parallel arrangements. Each of the plurality of column bodies 21 has a first end 211 and a second end 212. The first end 211 is connected to the second surface 12. Because the plurality of column bodies 21 are connected to the body portion 1, the plurality of first channels 10 respectively penetrate the plurality of column bodies 21, and in each of the first channels 10, two first openings 101 are formed on the first surface 11 and the second end 212 of a corresponding one of the column bodies 21, respectively.

The signal mating portion 3 is disposed on the third surface 13, and the signal mating portion 3 has a fifth surface 31 and a sixth surface 32 disposed opposite to each other. A plurality of second channels 30 are formed inside the signal mating portion 3 in the first direction, and in each of the second channels 30, two second openings 301 are formed on the fifth surface 31 and the sixth surface 32, respectively. The sixth surface 32 of the signal mating portion 3 is a mating interface for mating with a signal mating socket B3 (referring to FIG. 4). The mating interface may be a square interface. Two sides of the portion of the signal mating portion 3 connected to the third surface 13 can further respectively have two support portions 33 formed thereon to enhance the structural strength. Since each of the support portions 33 is a beveled surface, the fifth surface 31 is trapezoidal when viewed from the positive Y-axis of FIG. 1.

The snap-fit member 4 is disposed on the fourth surface 14. The snap-fit member 4 includes a press portion 41 and a snap-fit portion 42. The press portion 41 has a pressing surface 410 that is configured to be pressed by a user, the pressing surface 410 is parallel to an X-Y plane defined by the Y-axis direction and an X-axis direction that is perpendicular to the Y-axis direction, and a width of the pressing surface along the X-axis direction is at least 1.5 times a width of the snap-fit portion along the X-axis direction. Further, the snap-fit member 4 also includes a connection portion 43. The connection portion 43 is connected to the fourth surface 14. The press portion 41 is located on a rear side of a junction 431 between the connection portion 43 and the fourth surface 14 (i.e., a side of the snap-fit member 4 that extends in the negative Y-axis direction). The snap-fit portion 42 is located on a front side of the junction 431 (i.e., a side of the snap-fit member 4 that extends in the positive Y-axis direction) between the connection portion 43 and the fourth surface 14. A projection area of the press portion 41 projected onto the fourth surface 14 (or the third surface 13) at least partially overlaps with a projection area of the signal mating portion 3 projected onto the fourth surface 14. Preferably, a length of an overlapping projection area of the press portion 41 and the signal mating portion 3 projected onto the fourth surface 14 (or the third surface 13) in the first direction is equal to or greater than half of a length of the projection area of the press portion 41 projected onto the fourth surface 14 in the first direction.

Furthermore, the press portion 41 includes a convex portion 411, and the convex portion 411 has an inclined surface 41A and a horizontal surface 41B. Mainly, the convex portion 411 is a protruding portion formed on one side of the snap-fit member 4 near the first surface. As seen in FIG. 3, a projection area of the convex portion 411 projected onto the fourth surface 14 at least partially overlaps with a projection area of the signal mating portion 3 projected onto the fourth surface 14. More precisely, the inclined surface 41A of the convex portion 411 overlaps with the projection area of the signal mating portion 3 projected onto the fourth surface 14. Preferably, both the inclined surface 41A and the horizontal surface 41B of the convex portion 411 overlap with the projection area of the signal mating portion 3 projected onto the fourth surface 14.

Referring to FIGS. 1 to 3, in this embodiment, the first surface 11 and the fifth surface 31 are spaced apart by a first horizontal distance H1 in the first direction, and a junction between the inclined surface 41A and the horizontal surface 41B of the press portion 41 is spaced apart from the first surface 11 in a second horizontal distance H2 in the first direction. The first horizontal distance H1 is equal to or smaller than the second horizontal distance H2. Further, a fillet is formed at a junction between the first surface 11 and the third surface 13, that is, an edge corner of the body portion 1 near the signal mating portion 3 is rounded. Preferably, the fillet has a radius of curvature R between 0.5 mm and 0.8 mm.

Figure 4:
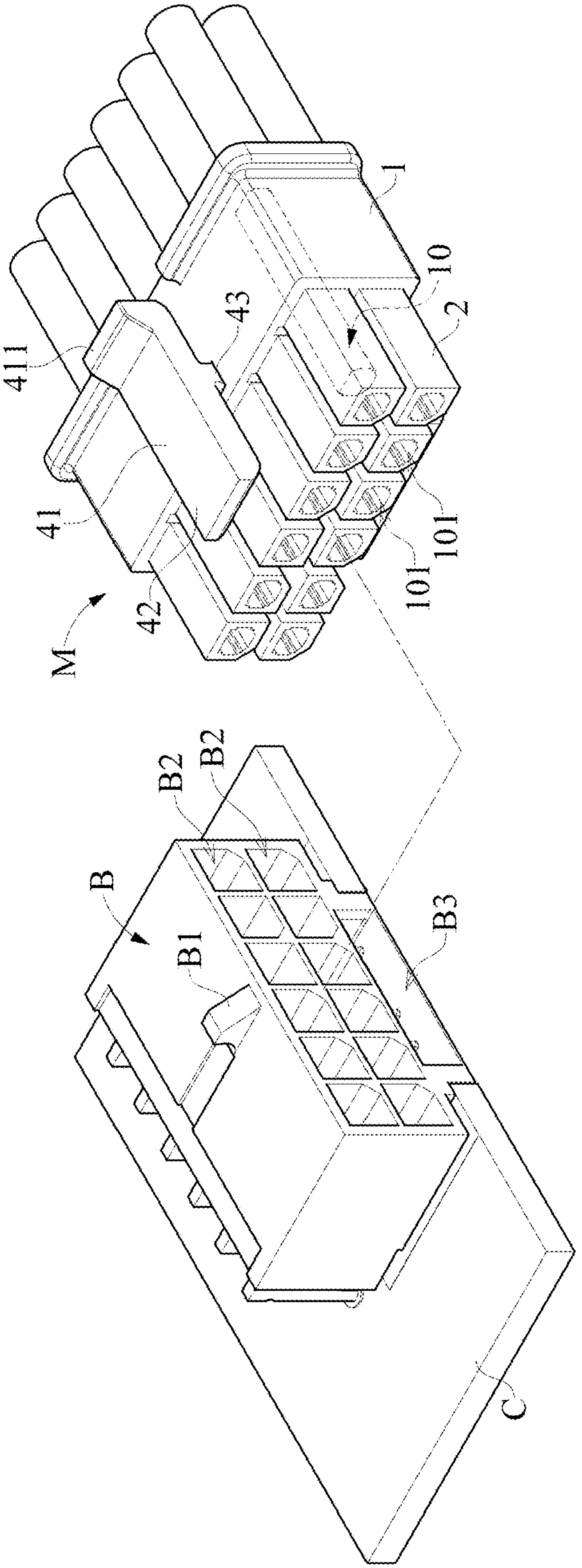
FIG. 4 is a schematic view of a wire-end connector and a board-end connector according to the first embodiment of the present disclosure.
Figure 5:
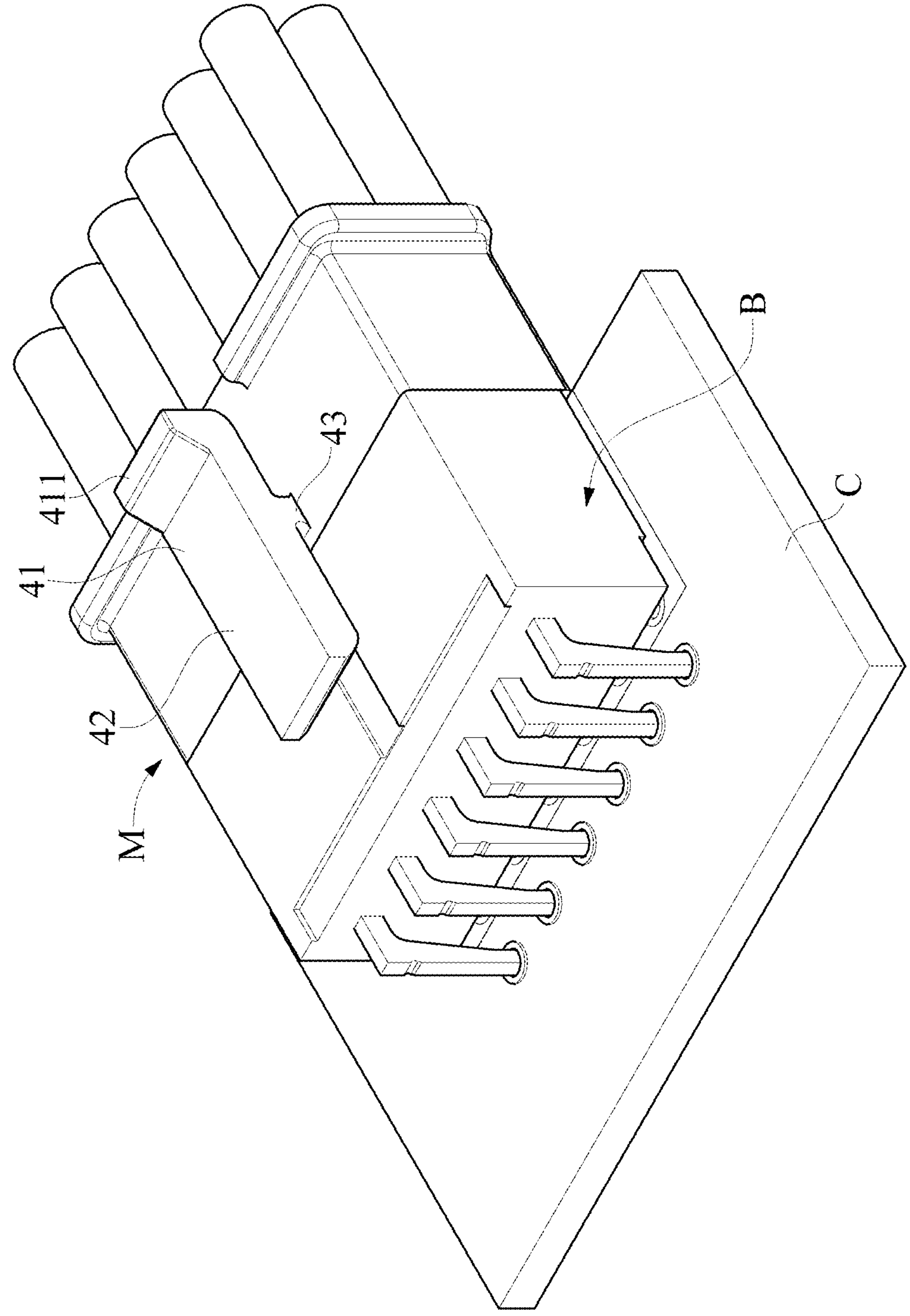
FIG. 5 is an assembly view of the wire-end connector and the board-end connector according to the first embodiment of the present disclosure.

Reference is made to FIG. 2, FIG. 4, and FIG. 5. FIG. 4 is a schematic view of a wire-end connector and a board-end connector according to the first embodiment of the present disclosure, and FIG. 5 is an assembly view of the wire-end connector and the board-end connector according to the first embodiment of the present disclosure. The present disclosure further provides a wire-end connector M, and the wire-end connector M includes the above-mentioned insulating housing A, a plurality of power wire-end terminals, and a plurality of signal wire-end terminals. The plurality of power wire-end terminals are inserted into (the plurality of first channels 10 of) the body portion 1 and the power mating portion 2 through the plurality of first openings 101 of the first surface 11, respectively. A plurality of signal wire-end terminals are inserted into the signal mating portion 3. In the embodiment, the plurality of signal wire-end terminals are inserted into (the plurality of second channels 30 of) the signal mating portion 3 through the plurality of second openings 301 of the fifth surface 31, respectively. When the wire-end connector M is assembled with the board-end connector B, a hook B1 of the board-end connector B will engage to the snap-fit portion 42 of the wire-end connector M. The power mating portion 2 of the wire-end connector M is mated into a plurality of power mating sockets B2 of the board-end connector B through the plurality of column bodies 21 of the power mating portion 2, and power board-end terminals (not shown in the drawings) in the power mating sockets B2 are in electrical contact with the plurality of power wire-end terminals through the first opening 101 of the second end 212 of each of the column bodies 21. Similarly, when the wire-end connector M is assembled with the board-end connector B, the signal mating portion 3 of the wire-end connector M is inserted in the signal mating socket B3 of the board-end connector B through the signal mating portion 3, and a plurality of signal board-end terminals (not shown in the drawings) in the signal mating socket B3 are in electrical contact with a plurality of signal wire-end terminals by being inserted in the plurality of second channels 30 through the plurality of second openings 301 of the sixth surface 32 of the signal mating portion 3. Therefore, the plurality of signal board-end terminals may transmit at least a portion of the following signals to the plurality of signal wire-end terminals, said signals indicating the following information: power supply status, voltage status, maximum power supply value, overcurrent protection, over temperature protection, emergency termination of power supply, etc. Then, the wire-end connector M is electrically connected to the circuit board C that is connected to the board-end connector B by being assembled to the board-end connector B. It is worth mentioning that, as shown in FIG. 1 and FIG. 2, one of the second channels 30 can be filled so as to be used as a fool-proof device in the present disclosure. In other words, the plurality of signal board-end terminals have two or more different terminal spacing (pitch) therebetween to provide a fool-proof effect.

As mentioned above, when the wire-end connector M and the board-end connector B are assembled or separated, the inclined surface 41A of the press portion 41 overlaps with a projection area of the signal mating portion 3 projected onto the fourth surface 14, and the first horizontal distance H1 is smaller than the second horizontal distance H2. Therefore, when the user takes the wire-end connector M, fingers of the user can be in contact with the press portion 41 and the signal mating portion 3 at two sides of the insulating housing A, respectively. The finger of a user will press on a position of the signal mating portion 3 instead of pressing the signal wire (not shown in the drawings). In addition, even if the user inadvertently presses the signal wire, since a fillet is formed at the junction between the first surface 11 and the third surface 13, that is, an edge corner of the body portion 1 near the signal mating portion 3 is rounded, the signal wire is subjected to a smaller cross-cutting force at the junction so as to avoid being broken or damaged.

It is worth mentioning that, in other embodiments, one side of the body portion 1 is flush with one side of the signal mating portion 3 (i.e., the first surface 11 is flush with the fifth surface 31), that is, the first horizontal distance H1 is equal to 0. In this case, when the user takes the wire-end connector M in hand, the fingers of the user can press on the position of the signal mating portion 3 instead of pressing the signal wire, so that there is no need to worry about the signal wire being broken by the cross-cutting force exerted by the edge corners of the body portion 1.

Second Embodiment

Figure 6:
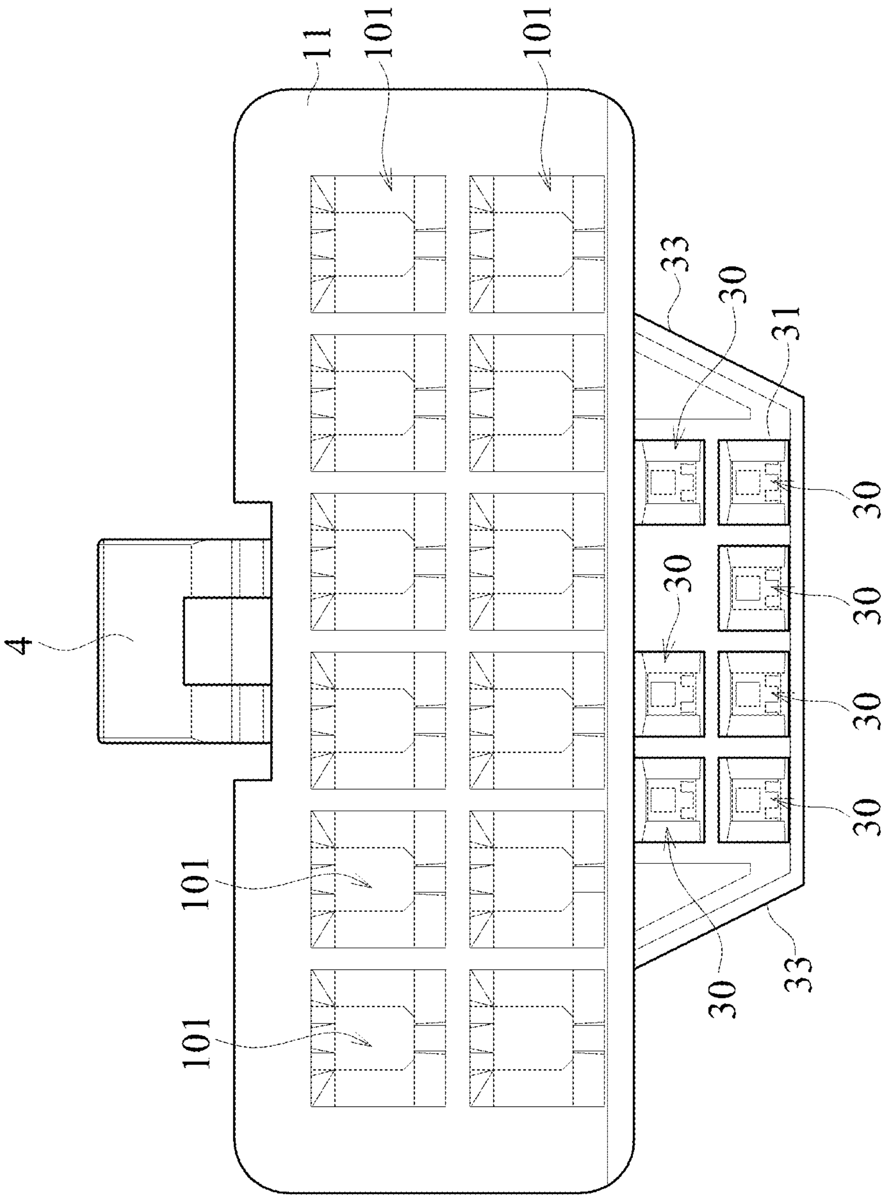
FIG. 6 is a front view of an insulating housing according to a second embodiment of the present disclosure.

Reference is made to FIG. 6. FIG. 6 is a front view of an insulating housing according to a second embodiment of the present disclosure. The insulating housing A provided in this embodiment has a similar structure compared with the insulating housing A provided in the first embodiment, and the similarities therebetween are not repeated. The difference between the insulating housing A of this embodiment and the insulating housing A of the first embodiment resides in that, the signal mating portion 3 of the insulating housing A has two rows of the second channels 30 in an upper and a lower arrangement. That is, the signal mating portion 3 of the insulating housing A has the plurality of second channels 30 in a horizontal and parallel arrangement, while the signal mating portion 3 of the insulating housing A of the first embodiment has only one row of the second channels 30. However, this disclosure is not limited by a number of the second channels 30.

Third Embodiment

Figure 7:
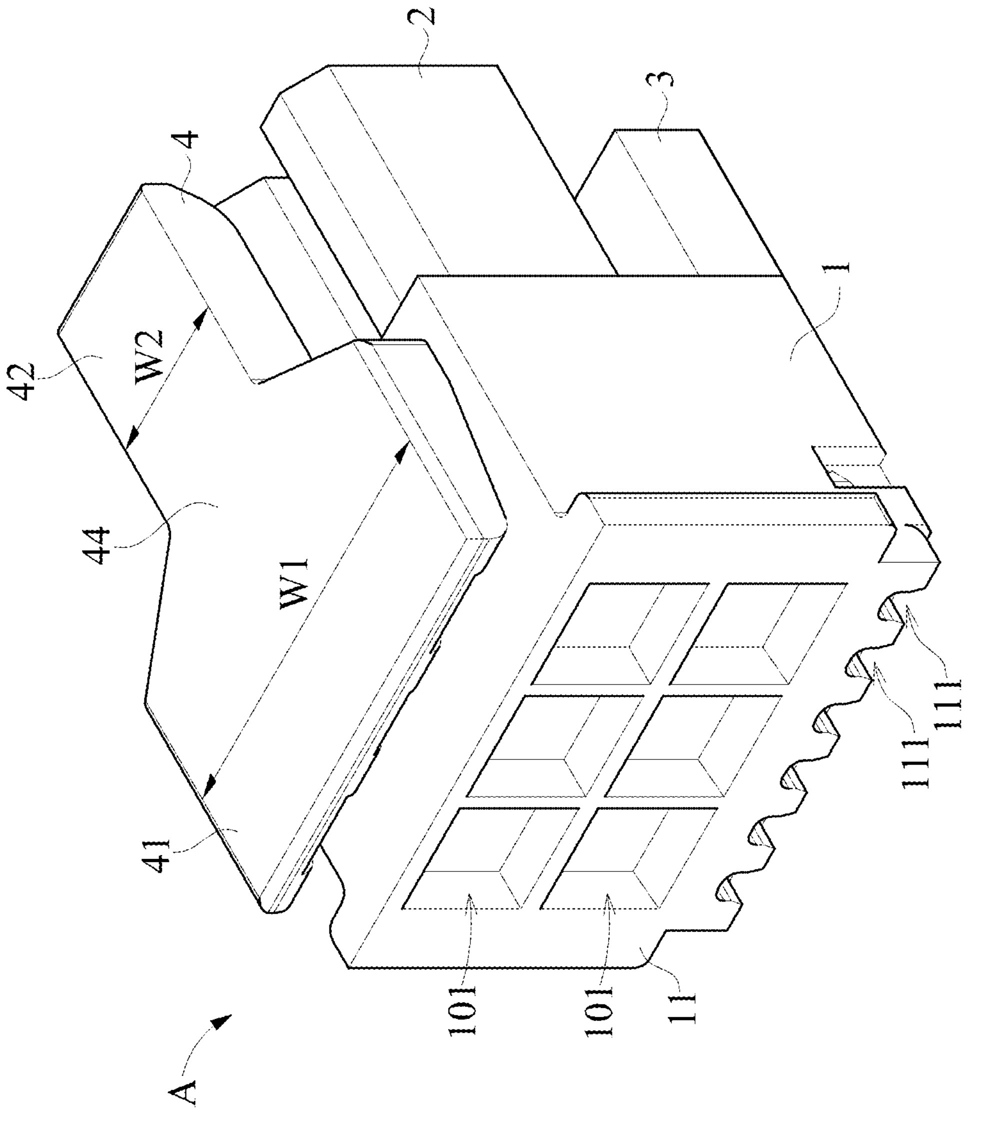
FIG. 7 is a perspective view of an insulating housing according to a third embodiment of the present disclosure.
Figure 8:
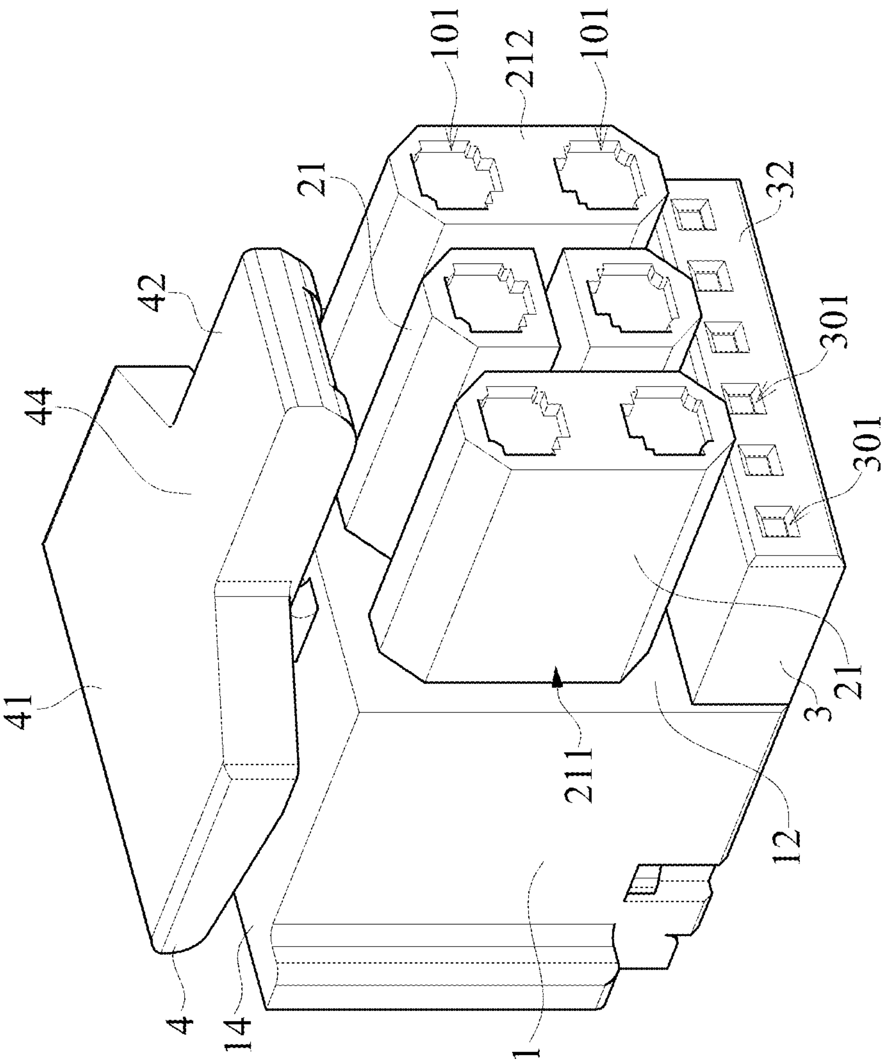
FIG. 8 is another perspective view of the insulating housing according to the third embodiment of the present disclosure.

Reference is made to FIG. 7 and FIG. 8. FIG. 7 is a perspective view of an insulating housing according to a third embodiment of the present disclosure, and FIG. 8 is another perspective view of the insulating housing according to the third embodiment of the present disclosure. The insulating housing A provided in this embodiment has a similar structure compared with the insulating housing A provided in the first embodiment, and the similarities therebetween are not repeated. The difference between the insulating housing A of this embodiment and the insulating housing A of the first embodiment resides in that, the snap-fit member 4 has a different shape and the first surface 11 has a plurality of recesses 111. In this embodiment, the press portion 41 of the snap-fit member 4 also includes a first portion 44, and the fan-shaped portion 44 is connected between the snap-fit portion 42 and the press portion 41. More precisely, the fan-shaped portion 44 is the part of the snap-fit member 4 having a variable width between the snap-fit portion 42 and the press portion 41. The power mating portion 2 is connected to the body portion 1 and extends along a mating direction. The press portion 41 has a first width W1 along a width direction and the snap-fit portion 42 has a second width W2 along the width direction, the first width W1 is a maximum width of the press portion 41, the second width W2 is a minimum width of the press portion 41, and the first width W1 is at least 1.5 times the second width W2. The width direction is parallel to the surface of the body portion and perpendicular to the mating direction. Preferably, the first width W1 is equal to or greater than 6 mm. In the present disclosure, by the design of the first width W1 being at least 1.5 times the second width W2, a surface area of a surface for being pressed on the snap-fit member 4 is widened to facilitate the application of force by the user. The plurality of recesses 111 are formed at positions on the third surface 13 that correspond to positions of the second openings 301 on the fifth surface 31 (i.e., the edge corner of the body portion 1 near the signal mating portion 3 corresponding to the positions of the plurality of signal wire-end terminals), and the plurality of recesses 111 can accommodate the wires of the signal wire-end terminal that extend from the second channels 30 of the signal mating portion 3.

Fourth Embodiment

Figure 9:
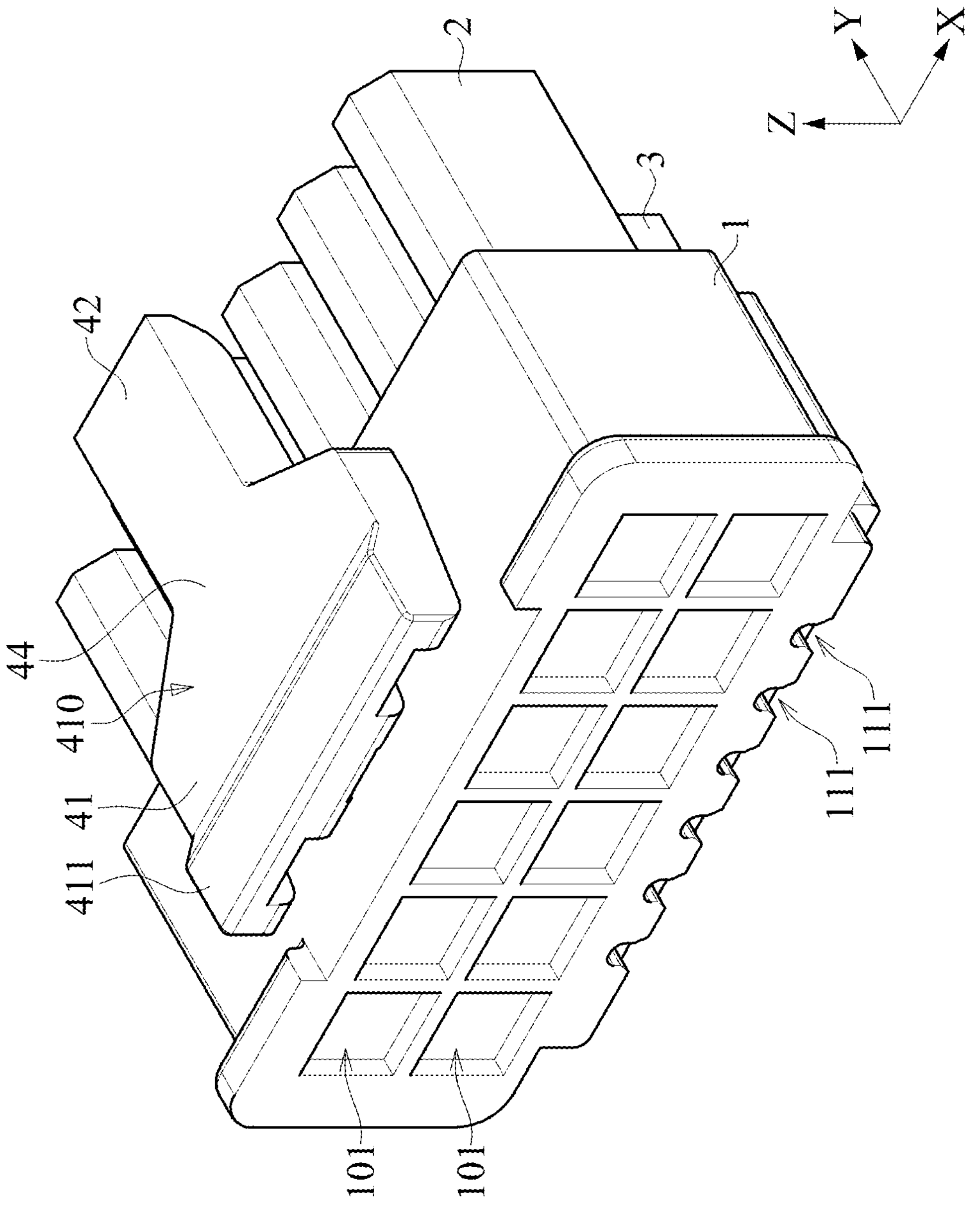
FIG. 9 is a perspective view of an insulating housing according to a fourth embodiment of the present disclosure.
Figure 10:
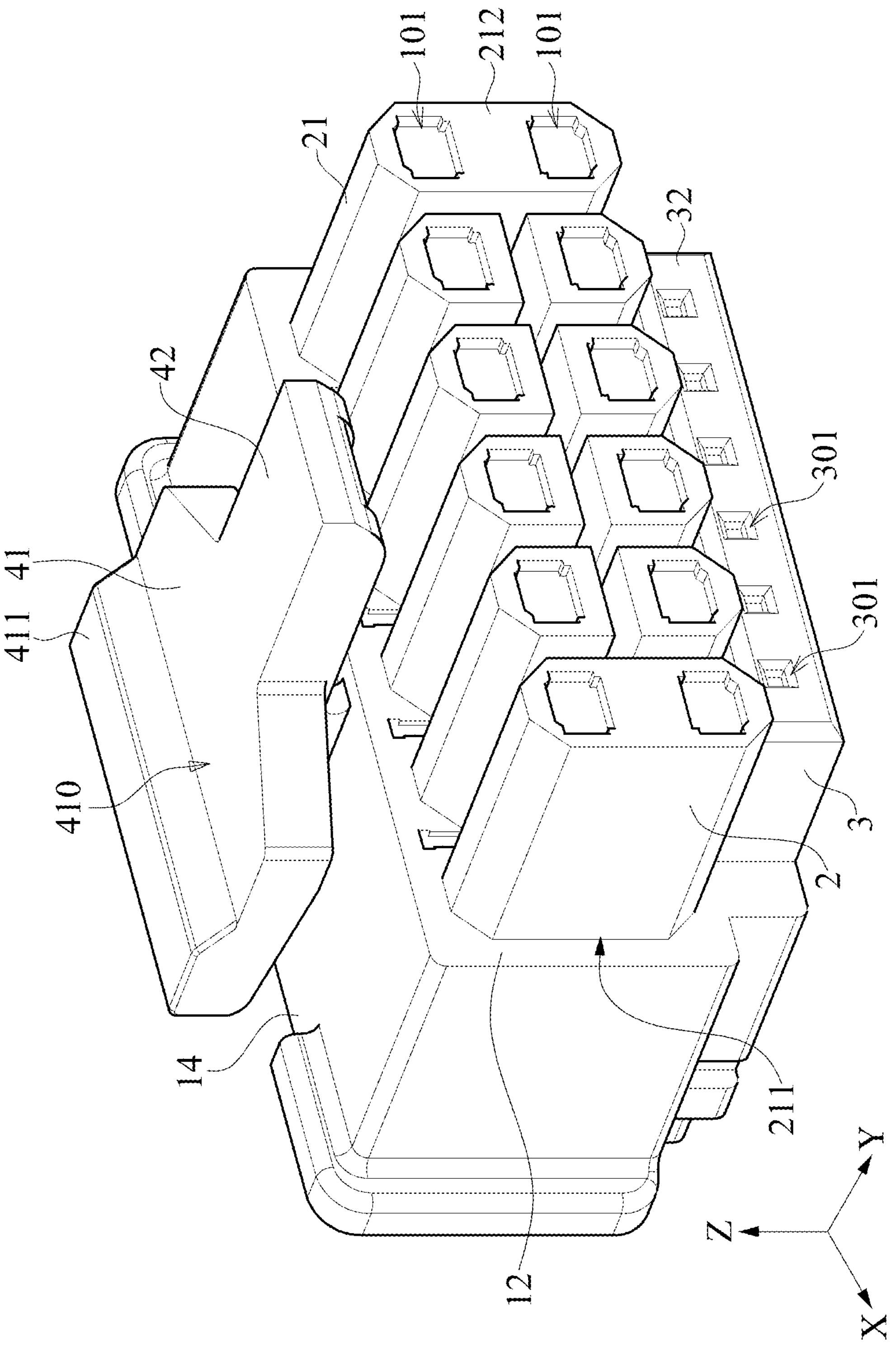
FIG. 10 is another perspective view of the insulating housing according to the fourth embodiment of the present disclosure.

Reference is made to FIG. 9 and FIG. 10. FIG. 9 is a perspective view of an insulating housing according to a fourth embodiment of the present disclosure, and FIG. 10 is another perspective view of the insulating housing according to the fourth embodiment of the present disclosure. The insulating housing A provided in this embodiment has a similar structure compared with the insulating housing A provided in the third embodiment, and the similarities therebetween are not repeated. The difference between the insulating housing A of this embodiment and the insulating housing A of the third embodiment resides in that, the press portion 41 further includes a convex portion 411, and the convex portion 411 is formed on an upper surface of the press portion 41. The convex portion 411 protrudes along a direction that is perpendicular to the X-Y plane from the upper surface of the press portion 41. A projection area of the convex portion 411 projected onto the fourth surface 14 at least partially overlaps with the projection area of the signal mating portion 3 projected onto the fourth surface 14.

Beneficial Effects of the Embodiments

In conclusion, one of the beneficial effects of the present disclosure is that, in the insulating housing A and the wire-end connector M provided by the present disclosure, by virtue of the projection area of the press portion 41 projected onto the surface of the body portion 1 at least partially being overlapped with the projection area of the signal mating portion 3 projected onto the surface of the body portion 1, the issue of a user inadvertently pressing on a signal wire at sides of a housing when mating/demating a wire-end connector M to a board-end connector B and causing the signal wire to be bent or loosened can be avoided.

Furthermore, in the insulating housing A and the wire-end connector M provided by the present disclosure, by the design of the first horizontal distance H1 being smaller than the second horizontal distance H2, and a fillet being formed at the junction between the first surface 11 and the third surface 13, when the user takes the wire-end connector M, fingers of the user can be in contact with the press portion 41 and the signal mating portion 3 at two sides of the insulating housing A, respectively. The finger of a user will press on a position of the signal mating portion 3 instead of pressing on the signal wire (not shown in the drawings). In addition, even if the user inadvertently presses the signal wire, since the junction between the first surface 11 and the third surface 13 is a fillet, the signal wire is subjected to a smaller cross-cutting force at the junction and avoids being broken.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An insulating housing configured for a cable connector, comprising:

a body portion, having a first surface and a second surface disposed opposite to each other in a first direction, and a third surface and a fourth surface disposed opposite to each other, the first surface and the second surface being connected between the third surface and the fourth surface, and a plurality of first channels formed therein along a Y-axis direction;

a power mating portion disposed on the second surface, having a plurality of column bodies, each having a first end connected to the second surface and a second end, wherein the plurality of first channels respectively penetrate the plurality of column bodies; and a snap-fit member, disposed on the fourth surface and having a press portion and a snap-fit portion that are connected with each other along the Y-axis direction, wherein the press portion has a pressing surface that is configured to be pressed by a user, the pressing surface is parallel to an X-Y plane defined by the Y-axis direction and an X-axis direction that is perpendicular to the Y-axis direction, and a width of the pressing surface along the X-axis direction is at least 1.5 times a width of the snap-fit portion along the X-axis direction.

2. The insulating housing according to claim 1, wherein the press portion has a fan-shaped portion.

3. The insulating housing according to claim 1, wherein the width of the pressing surface is larger than or equal to 6 mm.

4. The insulating housing according to claim 1, wherein a fillet is formed at a junction between the first surface and the third surface, and the fillet has a radius of curvature R between 0.5 mm and 0.8 mm.

5. The insulating housing according to claim 1, wherein the plurality of column bodies are arranged in at least two rows.

6. The insulating housing according to claim 1, wherein the press portion further has a convex portion that protrudes along a direction perpendicular to the X-Y plane from the pressing surface.

7. The insulating housing according to claim 1, further comprising a signal mating portion connected to the body portion, wherein a plurality of second channels are formed in the signal mating portion along the Y-axis direction, and each of second channels has two openings on two opposed sides of the signal mating portion.

* * * * *